United States Patent
Kang et al.

(10) Patent No.: US 12,264,766 B1
(45) Date of Patent: Apr. 1, 2025

(54) DUAL-PASSAGE, QUICK-CONNECT FLUID COUPLERS WITH INTEGRATED FLUID SENSORS AND METHODS FOR MAKING AND USING THE SAME

(71) Applicant: GM GLOBAL TECHNOLOGY OPERATIONS LLC, Detroit, MI (US)

(72) Inventors: Hyukjin Kang, Seoul (KR); Ikhyun Han, Seoul (KR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/814,804

(22) Filed: Aug. 26, 2024

(51) Int. Cl.
*F16L 37/24* (2006.01)
*F02M 35/10* (2006.01)
*F16L 37/244* (2006.01)

(52) U.S. Cl.
CPC ... *F16L 37/2445* (2013.01); *F02M 35/10222* (2013.01)

(58) Field of Classification Search
CPC .................. F16L 37/2445; F16L 37/08; F02M 35/10222; F01M 13/00
See application file for complete search history.

(56) References Cited

U.S. PATENT DOCUMENTS

| | | | |
|---|---|---|---|
| 5,628,531 A | 5/1997 | Rosenberg et al. | |
| 6,799,605 B1 * | 10/2004 | Van Scyoc | F16L 37/56 137/614.04 |
| 7,503,784 B2 * | 3/2009 | Osborne | F16L 41/008 285/305 |
| 8,002,315 B2 * | 8/2011 | Engle | G01L 19/0023 285/305 |
| 8,944,473 B2 * | 2/2015 | Lutzke | F16L 37/0985 285/305 |
| 8,955,500 B2 | 2/2015 | Spix et al. | |
| 10,008,049 B2 | 6/2018 | Wang et al. | |
| 2023/0160514 A1 | 5/2023 | Mbaye et al. | |

FOREIGN PATENT DOCUMENTS

GB 2532040 A * 5/2016 ............. F16L 37/06

OTHER PUBLICATIONS

Existing Crankcase Pressure Sensor (CcPS) Assembly Designs (Jun. 2024).

* cited by examiner

*Primary Examiner* — Grant Moubry
(74) *Attorney, Agent, or Firm* — Quinn IP Law

(57) ABSTRACT

Presented are dual-passage fluid couplers with integrated fluid sensors, methods for using/making such fluid couplers, and motor vehicles equipped with such fluid couplers. A quick-connect (QC) fluid coupler includes a sensor assembly with a sensor housing containing a sensing device that monitors fluid flow, and a main connector body with opposing inlet and outlet ends having respective inlet and outlet ports. The main connector body contains a sensor chamber attaching thereto the sensor housing, and a primary fluid chamber that extends from the inlet end to the outlet end of the main connector body and fluidly connects the inlet and outlet ports. Interposed between the primary and sensor chambers is a secondary fluid chamber that is fluidly connected to the sensor chamber via a sensor port and to the primary fluid chamber via a bleed port upstream from the sensor port and a merge channel downstream from the sensor port.

20 Claims, 4 Drawing Sheets

DUAL-PASSAGE, QUICK-CONNECT FLUID COUPLERS WITH INTEGRATED FLUID SENSORS AND METHODS FOR MAKING AND USING THE SAME

INTRODUCTION

The present disclosure relates generally to fittings and connectors for fluidly coupling components in a fluid system. More specifically, aspects of this disclosure relate to quick-connect couplers for fluidly connecting pressure sensors to engine assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and Wankel-type rotary engines, as some non-limiting examples. Hybrid-electric vehicles (HEV) and full-electric vehicles (FEV), on the other hand, utilize alternative power sources to propel the vehicle and, thus, minimize or eliminate reliance on a fossil-fuel based engine for tractive power.

A typical overhead valve (OHV) engine assembly is constructed with an engine block that contains a succession of internal cylinder bores, each of which has a piston reciprocally movable therein. Mounted onto the engine block is a cylinder head that cooperates with each cylinder bore-and-piston pair to form a variable-volume combustion chamber. These reciprocating pistons are used to convert pressure-generated by igniting a fuel-and-air mixture inside the combustion chamber-into rotational forces to drive an engine crankshaft. The cylinder head defines intake ports through which air, provided by an intake manifold, is introduced into each combustion chamber. Exhaust ports defined in the cylinder head evacuate exhaust gases and byproducts of combustion from the discrete combustion chambers to an exhaust manifold. This exhaust manifold, in turn, collects and combines exhaust gases for metered recirculation into the intake manifold, delivery to a turbine-driven turbocharger, or evacuation from the vehicle through an exhaust system.

Four-stroke combustion engines commonly operate—as the name suggests—in four distinct stages or "strokes" to drive the engine's crankshaft. At an initial (first) stage of operation, referred to as the "intake stroke," a metered volume of fuel is injected into the cylinder as the piston travels rectilinearly from top-to-bottom along the length of the bore. Engine intake valves are opened such that a vacuum pressure generated by the downward-travelling piston draws air into the chamber. For direct-injection systems, a metered quantity of finely atomized fuel is introduced into the chamber via a fuel injector. During a subsequent (second) stage, referred to as the "compression stroke," the intake and exhaust valves are closed as the piston travels from bottom-to-top and concomitantly compresses the fuel-air mixture. Upon completion of the compression stroke, a following (third) stage or "power stroke" commences when a spark plug ignites the compressed fuel and air, with the resultant explosive expansion of gases pushing the piston back to bottom dead center (BDC). During a successive stage-known as the "exhaust stroke"—the piston once again returns to top dead center (TDC) with the exhaust valves open; the travelling piston expels the spent air-fuel mixture from the combustion chamber.

Combustion chamber gases incident to engine operation—be it air, water vapor, fuel-entrained air, or exhaust—may escape an engine cylinder, blow past the piston ring, and enter the engine's crankcase. The crankcase houses the engine's crankshaft and acts as a fluid sump for storing oil used to lubricate the crankshaft, the pistons, and other moving engine parts. Gas that enters the crankcase from the cylinders—commonly referred to as "blow-by vapor"—may contaminate the engine oil or condense and combine with oil vapor present in the crankcase and form "oil sludge". A positive crankcase ventilation (PCV) system may be used to vent blow-by vapor from the engine crankcase in order to minimize oil contamination and decrease pressure within the crankcase. The PCV system may recirculate blow-by gases through a PCV valve to a turbocharger or the intake manifold, where the recycled gas may be fed back into the cylinders for combustion. When the engine is idling, air pressure in the intake manifold may be lower than the crankcase's internal air pressure, which creates a vacuum pressure that draws blow-by vapor into the PCV system. As engine load increases, the amount of blow-by gas coming from the cylinder bores may concomitantly increase; the blowby-by gas flow rate may be controlled by the PCV valve depending on intake pressure of the air intake manifold or turbocharger. Typically, the crankcase pressure lowers according to engine load increase when the blow-by gas flows by the vacuum of the turbocharger. The PCV system may employ an in-situ crankcase pressure sensor (CcPS) to monitor this pressure differential.

SUMMARY

Presented below are dual-passage, quick-connect (QC) fluid couplers with integrated fluid sensors for monitoring select fluid flow characteristics, methods for making and methods for using such QC fluid couplers, and motor vehicles equipped with PCV systems using such QC fluid couplers. In a non-limiting example, a QC fluid coupler for a PCV system of an engine assembly is fabricated with a main connector body that contains a pair of parallel-flow internal fluid chambers that are fluidly connected by an upstream drain port and a downstream merge channel. The primary fluid chamber originates at a proximal (first) end of the main connector body, e.g., which may couple via retainer clip and O-ring to a crankcase spigot, and terminates downstream at a distal (second) end of the main connector body, e.g., which may couple via barbed endcap to a PCV flex-hose and PCV valve. A CcPS assembly is mounted onto the main connector body and fluidly coupled to the secondary fluid chamber, which is separated from the primary fluid chamber by an internal wall. The barbed endcap is mounted to the main connector body, e.g., via fastening, welding, or AM printing, and defines therein the downstream merge channel, which extends between and is obliquely oriented with respect to the primary and secondary fluid chambers. A sloped shield wall may be interposed between the drain port and an internal sensor port to prevent vapor intrusion into the CcPS assembly. The sensor-side secondary fluid chamber is structurally separated from, yet has a synchronized flow direction with the main blow-by gas flow in the primary chamber.

Attendant benefits for at least some of the disclosed concepts include QC coupler designs that help to prevent water vapor intrusion into the CcPS, which might otherwise cause a sensor malfunction due to water condensation or icing in cold weather conditions. The sensor-side secondary fluid chamber, for example, is integrated into the QC main connector body such that blow-by gas with high vapor pressure is not able to penetrate the CcPS assembly. Unlike other commercially available PCV coupler designs, disclosed CcPS assemblies do not project into nor have direct fluid contact with the main blow-by gas flow. The dual-passage connector design may also help to ensure that the CcPS is able to read an exact pressure value inside the blow-by flow path without a pressure drop in the primary fluid chamber. The parallel-flow internal fluid chambers are merged by the Y-shaped barbed endcap so that vacuum sources from a turbocharger or an intake may be applied equivalently.

Aspects of this disclosure are directed to dual-passage, quick-connect fluid couplers with integrated fluid sensors for monitoring select characteristics of fluid flowing through the coupler (e.g., pressure, flow rate, temperature, etc.). In an example, there is presented a QC fluid coupler for fluidly coupling a fluid source (e.g., engine crankcase) to a fluid conduit (e.g., PCV recirculation line). The CQ coupler includes a sensor assembly (e.g., CcPS) with a sensor housing and a sensing device (e.g., capacitive, piezoresistive, or diffused silicon pressure sensor) located inside the sensor housing. The sensing device actively monitors fluid flowing from the fluid source to the fluid conduit. The CQ coupler also includes a main connector body with opposing inlet and outlet ends with respective inlet and outlet ports. The main connector body contains a sensor chamber that attaches thereto the sensor housing, and a primary fluid chamber that extends from the inlet end to the outlet end of the connector body and fluidly connects the inlet port to a primary outlet port. A secondary fluid chamber is structurally and fluidly interposed between the sensor chamber and the primary fluid chamber inside the main connector body. The secondary fluid chamber is fluidly connected to the sensor chamber via a single sensor port extending through an internal wall of the connector body. The secondary fluid chamber is also fluidly connected to the primary fluid chamber via a bleed port, which is upstream from the sensor port, and a merge channel, which is downstream from the sensor port.

Additional aspects of this disclosure are directed to motor vehicles equipped with PCV systems using dual-passage QC fluid couplers for connecting the crankcase to a PCV recirculation line. As used herein, the terms "vehicle" and "motor vehicle" may be used interchangeably and synonymously to include any relevant vehicle platform, such as passenger vehicles (e.g., ICE, HEV, FCHEV, fully and partially autonomous, etc.), commercial vehicles, industrial vehicles, tracked vehicles, off-road and all-terrain vehicles (ATV), motorcycles, farm equipment, aircraft, watercraft, spacecraft, etc. In an example, a motor vehicle includes a vehicle body with a passenger compartment, multiple road wheels mounted to the vehicle body (e.g., via wheel modules coupled to a unibody or body-on-frame chassis), and other standard original equipment. An internal combustion engine assembly is attached to the vehicle body (e.g., supported on engine mounts inside an engine bay) and operable to drive one or more of the road wheels to thereby propel the motor vehicle. The ICE assembly includes an engine block, a crankcase mounted to or integral with the engine block, an air intake system, an optional turbocharger, and a recirculation line fluidly connecting the crankcase to the intake system and/or the turbocharger.

Continuing with the discussion of the foregoing vehicle example, the ICE assembly also includes a QC fluid coupler with a pressure sensor assembly that includes a sensor housing and a pressure sensing device located in the sensor housing. The pressure sensing device monitors operating fluid pressures of blow-by gases flowing from the crankcase to the recirculation line. The QC fluid coupler also includes a single-piece main connector body and a single-piece endcap that is welded onto one end of the main connector body. The main connector body includes an inlet end with an inlet port that are opposite and upstream from an outlet end with primary and secondary outlet ports. The inlet port is mounted on and fluidly coupled to a ventilation spigot of the crankcase, whereas the outlet ports are fluidly coupled to the recirculation line. The main connector body contains three distinct yet interconnected internal chambers: (1) a sensor chamber nesting therein a portion of the sensor housing; (2) a primary fluid chamber extending from the inlet end to the outlet end of the connector body and fluidly connecting the inlet port to the primary outlet port; and (3) a secondary fluid chamber interposed between the sensor chamber and the primary fluid chamber. The secondary chamber is fluidly connected to the sensor chamber via a sensor port and to the primary chamber via a bleed port upstream from the sensor port. The endcap contains a merge channel that is downstream from the sensor port and fluidly connects the secondary fluid chamber to the primary fluid chamber.

Aspects of this disclosure are also directed to methods for manufacturing and methods for using any of the herein-described QC couplers, engine assemblies, and/or motor vehicles. In an example, a method is presented for manufacturing a quick-connect fluid coupler for fluidly coupling a fluid source to a fluid conduit. This representative method includes, in any order and in any combination with any of the above and below disclosed options and features: receiving a sensor assembly including a sensor housing and a sensing device located in the sensor housing, the sensing device being configured to monitor fluid flowing from the fluid source to the fluid conduit; forming a main connector body including an inlet end with an inlet port opposite an outlet end with at least one outlet port, the main connector body being formed to define therein: a sensor chamber, a primary fluid chamber extending from the inlet end to the outlet end of the main connector body and fluidly connecting the inlet and outlet ports, and a secondary fluid chamber interposed between the sensor chamber and the primary fluid chamber, wherein the secondary fluid chamber is fluidly connected to the sensor chamber via a sensor port and fluidly connected to the primary fluid chamber via a bleed port upstream from the sensor port and a merge channel downstream from the sensor port; and attaching the sensor housing to the sensor chamber of the main connector body.

For any of the disclosed QC couplers, vehicles, and methods, an endcap may be mounted to the outlet end of the main connector body; this endcap may contain the merge channel that fluidly connects the secondary fluid chamber to the primary fluid chamber. Alternatively, the merge channel may be integrated into the main connector body and fluidly connected directly to the outlet port. The endcap may also define therein an exhaust channel that is fluidly connected to the primary fluid chamber. In this instance, the merge channel is interposed between and fluidly connects the secondary fluid chamber to the exhaust channel and thereby fluidly connects the secondary fluid chamber to the primary fluid chamber. As a further option, the secondary fluid chamber may be substantially parallel to the primary fluid chamber, the exhaust channel may be coaxial with the primary fluid chamber, and the merge channel may be obliquely angled with respect to the primary and secondary fluid chambers. It is also envisioned that the primary fluid chamber, the secondary fluid chamber, and the exhaust channel may be substantially rectilinear and may be substantially parallel with one another.

For any of the disclosed QC couplers, vehicles, and methods, the endcap may include opposing upstream and downstream cap ends; the upstream cap end may be welded to the outlet end of the main connector body, whereas the downstream cap end may be integrally formed with a barbed hose connector, e.g., that interference fits into a PCV recirculation line. It may be desirable that the main connector body and the endcap be integrally fabricated as a unitary, single-piece structure (e.g., via welding, AM printing, or injection molding). As another option, the secondary fluid chamber may be substantially parallel to the primary fluid chamber and separated therefrom by a mutually adjoining (first) internal wall of the main connector body. This internal wall may define therethrough the bleed port that fluidly connects the secondary and primary fluid chambers. In a similar regard, the secondary fluid chamber may be substantially orthogonal to the sensor chamber and separated therefrom by a mutually adjoining (second) internal wall of the main connector body. This internal wall may define therethrough the sensor port that fluidly connects the sensor chamber to the secondary fluid chamber. In this instance, the main connector body may include a sloped shield wall that projects from the internal wall at an oblique angle and partially obstructs the sensor port. The sloped shield wall may adjoin an upstream edge of the sensor port and project inward into the secondary fluid chamber.

For any of the disclosed QC couplers, vehicles, and methods, the sensor assembly may be rigidly mounted, e.g., via threaded fastener(s), onto the main connector body with a portion of the sensor housing disposed inside the sensor chamber. As another option, the main connector body, including the sensor chamber, the primary fluid chamber, and the secondary fluid chamber, may be integrally formed (e.g., via injection molding, resin transfer molding, or AM printing) as a unitary, single-piece structure such that the secondary fluid chamber is sandwiched between the sensor chamber and the primary fluid chamber. It may be desirable that the inlet end of the main connector body be integrally formed with a twist-lock connector that attaches to a mating male spigot, e.g., via a retainer clip and O-ring seal. As yet another option, the primary fluid chamber may have a first internal diameter and the secondary fluid chamber may have a second internal diameter that is less than the first internal diameter (e.g., 30-50% smaller). It is also envisioned that the internal diameter of the primary fluid chamber may vary along the length of the main connector body (e.g., the inlet port diameter is larger than the outlet port diameter). Optionally, the exhaust channel diameter may be smaller than the outlet port diameter.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
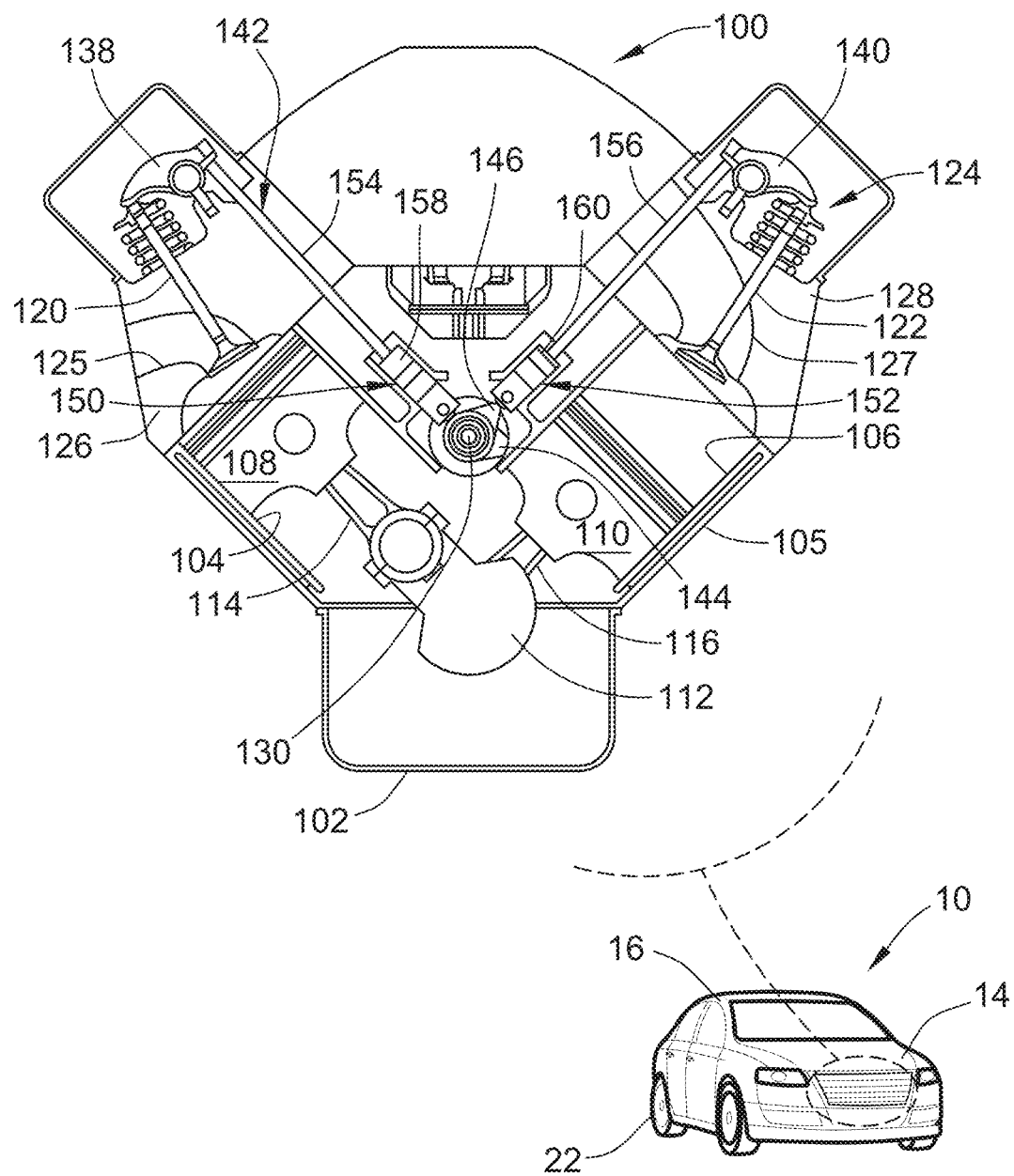
FIG. 1 is a front, perspective-view illustration of a representative motor vehicle with an inset schematic illustration of a representative reciprocating-piston type internal combustion engine assembly with which aspects of the present disclosure may be practiced.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless explicitly disclaimed: the singular includes the plural and vice versa (e.g., indefinite articles "a" and "an" are to be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, top, bottom, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as a gas-powered, sedan-style passenger vehicle. The illustrated automobile 10—also referred to herein as "motor vehicle" or "vehicle" for short—is merely an exemplary application with which novel aspects of this disclosure may be practiced. In the same vein, implementation of the present concepts into a four-stroke, spark-ignited gasoline engine of an ICE-based powertrain should also be appreciated as exemplary applications of the novel concepts disclosed herein. As such, it will be understood that features of this disclosure may be applied to other engine configurations, incorporated into alternative powertrain architectures, and utilized for any logically relevant type of motor vehicle. Lastly, only select components of the motor vehicle, engine assemblies, and PCV systems have been shown and will be described in additional detail herein. Nevertheless, the vehicles, engines and systems discussed below may include numerous additional and alternative features, and other available peripheral components for carrying out the various methods and functions of this disclosure.

FIG. 1 illustrates an example of a V-type, overhead valve (OHV) internal combustion engine assembly 100 that is mounted inside an engine bay 14 of a vehicle body 16 of the motor vehicle 10. The illustrated ICE assembly 100 is a four-stroke, reciprocating-piston engine configuration that operates to drive one or more of the vehicle's road wheels 22 to thereby propel the vehicle 10, for example, as a direct injection (DI) or port fuel injection (PFI) gasoline engine, including flexible-fuel vehicle (FFV) and hybrid electric vehicle (HEV) variations thereof. The engine assembly 100 can optionally operate in any of an assortment of selectable combustion modes, including a homogeneous-charge compression-ignition (HCCI) combustion mode and a variable-lift (active fuel management (AFM)) spark-ignition (SI) combustion mode. Although not explicitly portrayed in FIG. 1, it is envisioned that the vehicle driveline may take on any available configuration, including front wheel drive (FWD) layouts, rear wheel drive (RWD) layouts, all-wheel drive (AWD) layouts, four-wheel drive (4WD) layouts, etc.

The illustrated engine assembly 100 includes a cast-metal engine block 105 with a staggered sequence of cylinder bores, such as a first cylinder bore (or set of cylinder bores) 104 and a second cylinder bore (or set of cylinder bores) 106. A ring-bearing piston 108 and 110 is reciprocally movable within each cylinder bore (or "cylinder" for short) 104, 106, i.e., to translate rectilinearly from a top-dead-center (TDC) position to a bottom-dead-center (BDC) position. A torque-transmitting engine crankshaft 112 is rotatably mounted inside an engine crankcase 102, which is sealingly fastened to or integrally formed with the underside of the engine block 105. Each piston 108, 110 is coupled to the crankshaft 112 via a bearing-mounted connecting rod 114 and 116. Engine pistons 108, 110 are typically provided in even numbers of 4, 6, 8, etc., and arranged in a V-type or I-type configuration; however, disclosed concepts are similarly applicable to alternative cylinder counts (e.g., 3, 5, etc.) and layouts (e.g., H-type, flat, Wankel, etc.). The top surface of each piston 108, 110 cooperates with the inner periphery of its corresponding cylinder 104, 106 and a respective chamber surface of a cylinder head 126 and 128 to define a variable-volume combustion chamber. The crankshaft 112, in turn, transforms the linear reciprocating motion of the pistons 108, 110 to rotational motion that is output, for example, as a number of rotations per minute (RPM) to a power transmission (not shown) to drive one or more road wheels 22.

With continuing reference to the inset view of FIG. 1, an engine valvetrain system 124 employs a set of one or more intake valves 120 and one or more exhaust valves 122 for each cylinder 104, 106 to regulate the intake and exhaust of its variable-volume combustion chamber. A pair of cylinder heads 126, 128 are mounted onto the engine block 105 to define a V-type engine configuration having two banks of cylinders 104, 106 disposed at an angle relative to each other. An air intake system 132 (FIG. 2) upstream from the intake valves 120 transmits intake air to the cylinders 104, 106 through an intake manifold, which directs and distributes air into the individual combustion chambers via respective intake runners 125 and intake ports of the cylinder head 126, 128. The engine's air intake system has airflow ductwork and various electronic devices for monitoring and regulating incoming air flow. Airflow from the intake manifold into each combustion chamber is controlled by one or more of the engine intake valves 120, whereas evacuation of exhaust gases and combustion byproducts out of each combustion chamber through respective exhaust runners 127 to an exhaust manifold of an engine exhaust system is controlled by one or more of the engine exhaust valves 122.

The valvetrain system 124 employs a time-phased camshaft 130 that is rotatably mounted inside a camshaft pocket in a cylinder bank valley of the engine block 105 to selectively activate the intake and exhaust valves 120, 122. The camshaft 130 supports thereon and concomitantly rotates a series of cam lobes, such as intake and exhaust cams 144 and 146, respectively. A cam-to-rocker (CTR) drive system 142 may drivingly engage the intake and exhaust cams 144, 146 with respective rocker arms 138 and 140 to pivot the rocker arms 138, 140 and thereby open the intake and exhaust valves 120, 122. The CTR drive system 142 may include cam-engaging valve lifters 150 and 152 that are each secured to a distal (bottom) end of a respective engine pushrod 154 and 156 and slidably seated on a respective one of the cams 144, 146. The valve lifters 150, 152 transmit input forces from the camshaft cams 144, 146 to the pushrods 154, 156 to convert the rotational motion of the camshaft 130 into linear motion of the pushrods 154, 156. The valve lifters 150, 152 may each include a roller tappet 158 and 160 (as shown) or a round-tip lifter, which may take on solid or hydraulic form factors.

During engine operation, rotation of the camshaft 130 causes the intake and exhaust cams 144, 146 to push against and effect reciprocal linear translation of the lifters 158, 160 and pushrods 154, 156. The pushrods 154, 156, in turn, push against mating ends of the rocker arms 138, 140; doing so causes the rocker arms 138, 140 to pivot against and press onto valve stems of the intake and exhaust valves 120, 122. It is also envisioned that the CTR drive system 142 may employ other types of valve lift configurations, including both continuous and discrete variable valve lift (VVL) devices. For instance, activation of the engine valves 120, 122 may be modulated by controlling exhaust and intake variable cam phasing/variable lift control (VCP/VLC). It is also possible to replace the valve lifters 150, 152 with hydraulic lash adjusters or solid valve lifters. These engine valves 120, 122 are illustrated herein as spring-biased poppet valves; however, other commercially available types of engine valves may be employed. It should also be noted that disclosed concepts may be similarly applied to overhead cam (OHC) engine architectures.

During operation of the engine assembly 100, a Positive Crankcase Ventilation (PCV) system 134 may be employed to vent blow-by gases (shown with hidden arrows in FIG. 3) from the crankcase 102 through a PCV spigot 136 and recirculate the vented blow-by gases through a PCV recirculation line 148 and a pressure regulator valve 162 to an intake manifold of the engine's air intake system 132. A dual-passage, quick-connect (QC) fluid coupler 200 may connect a crankcase pressure sensor (CcPS) assembly 202 in-line with the blow-by gas flow path to detect if there is a leak in the PCV system 134, such as a disconnected or faulty QC coupler or a leaking or detached recirculation line 148. Available CcPS assemblies are typically mounted by a fluid fitting or sensor housing interface such that the sensor is directly exposed to the internal flow path of the blow-by gas with sufficient surface area to accurately measure gas pressure in the flow path without causing a pressure drop. However, this direct sensor exposure may trigger a diagnostic fault due to the unwanted ingress of water condensation or icing of the sensor. In particular, blow-by gases may contain a significant amount of moisture and water vapor that may enter the sensor and result in water saturation or ice accumulation of the sensor.

To minimize sensor saturation and icing, some available QC fittings have specially designed constructions that package the CcPS away from the blow-by gas path to prevent vapor intrusion. However, these designs may cause a significant pressure loss that engender inaccurate pressure readings and attendant calibration malfunctions. Some existing PCV architectures mount the CcPS assembly directly onto the PCV recirculation line such that the sensor inlet is directly exposed to the recirculation line's internal passage to read blow-by gas pressure from inside the tube. These designs, however, may generate additional leak and failure points in the PCV system. Other PCV architectures employ additional hoses and fittings to package the CcPS away from the PCV tube, which generates a measurable pressure loss in the parallel route that causes incorrect pressure measurements with a concomitant false Diagnostic Trouble Code (DTC).

Discussed below are dual-passage, quick-connect fluid couplers that contain a dedicated sensor compartment and a distinct blow-by fluid passage that collectively isolate the CcPS from the QC coupler's main blow-by passage. This multi-chamber design helps to ensure accurate in-line pressure measurements of the blow-by gas stream while minimizing water intrusion and icing of the sensor package. Additionally, the dedicated blow-by fluid passage within the QC coupler body helps to preclude contamination of water vapor, fuel vapor, oil mist, etc., in the blow-by gas stream without producing an unintended pressure drop. A barbed male endcap may be welded to the downstream end of the QC coupler body and fluidly coupled to both the main blow-by passage and the sensor's dedicated blow-by passage to merge the dual passages into a single outlet passage. This design may also enable the QC fluid coupler to be mounted with a predefined slope that guides accumulated water vapor within the coupler towards the vacuum source and, thus, preventing the vapor from flowing towards the sensor inlet.

Figure 2:
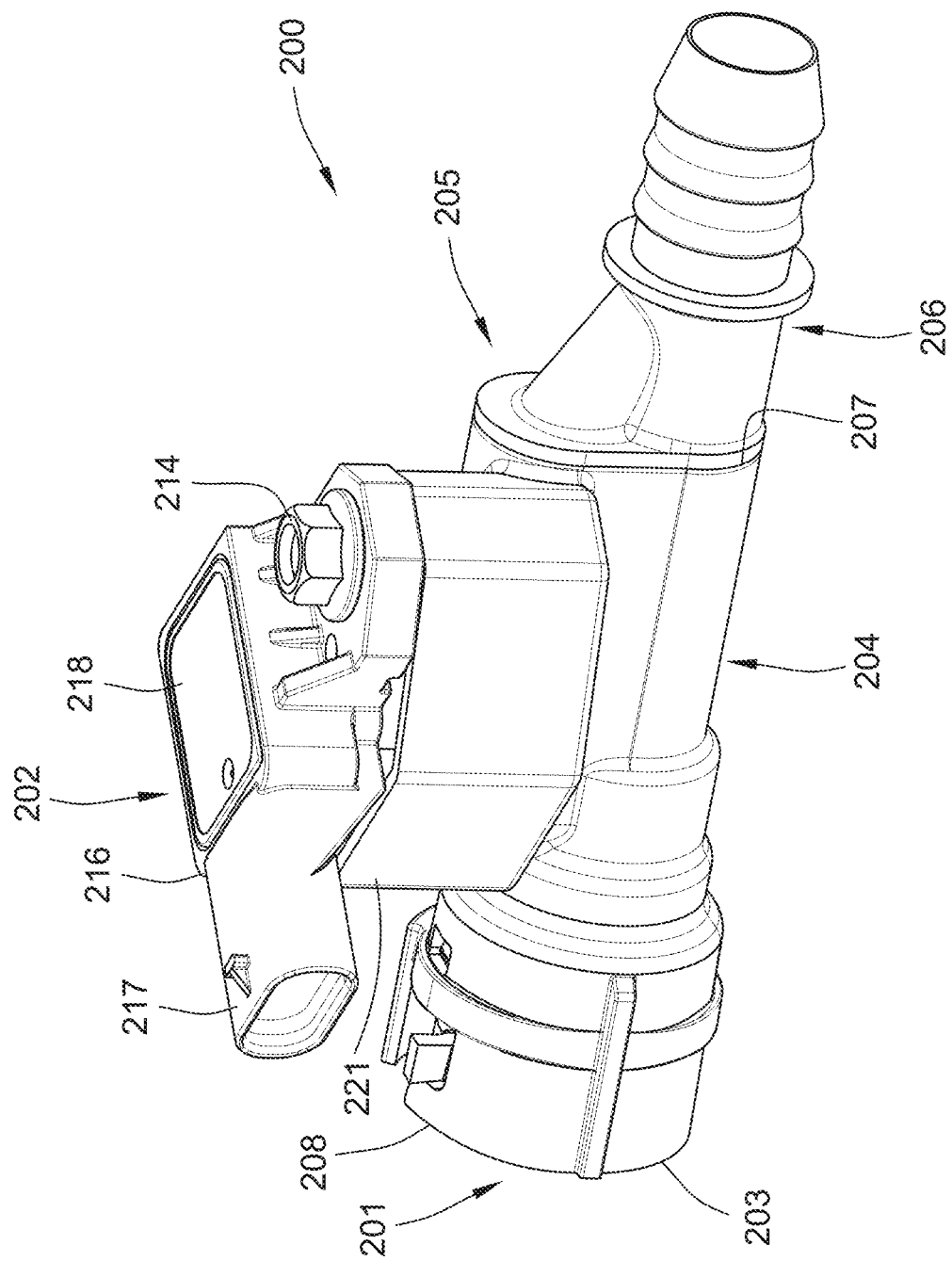
FIG. 2 is a perspective-view illustration of a dual-passage, quick-connect (QC) fluid coupler with an integrated crankcase pressure sensor (CcPS) for a positive crankcase ventilation (PCV) system in accordance with aspects of the present disclosure.

Turning to FIG. 2, there is shown a representative example of a dual-passage QC coupler 200 for fluidly connecting a fluid source (e.g., engine crankcase 102) to a fluid conduit (e.g., PCV recirculation line 148). Although depicted and described as fluidly coupling the crankcase 102 to the air intake system 132, it is envisioned that the QC fluid coupler 200 may fluidly couple the crankcase 102 to an engine turbocharger or exhaust manifold or, alternatively, may be adapted for use in other vehicular applications. In accord with the illustrated example, the QC fluid coupler 200 unit may be typified by three primary components: a sensor assembly 202, a main connector body 204, and a connector endcap 206. The sensor assembly 202 may be composed of a weather-resistant sensor housing 216 with a sensing device 218 (e.g., capacitive, piezoresistive, or diffused silicon pressure sensor) that is fluidly sealed inside the sensor housing 216 and operable to measure select characteristics of fluid flowing through the QC coupler 200 (e.g., pressure, flow rate, temperature, etc.). A plug receptacle portion 217 of the sensor housing 216 receives therein a complementary sensor plug (not shown) for electrically connecting the internal sensing device 218 to a resident system controller or control module. While described for use with a CcPS in a PCV application, it should be appreciated that the QC coupler 200 may be adapted to accommodate other sensor packages for other intended implementations.

Figure 3:
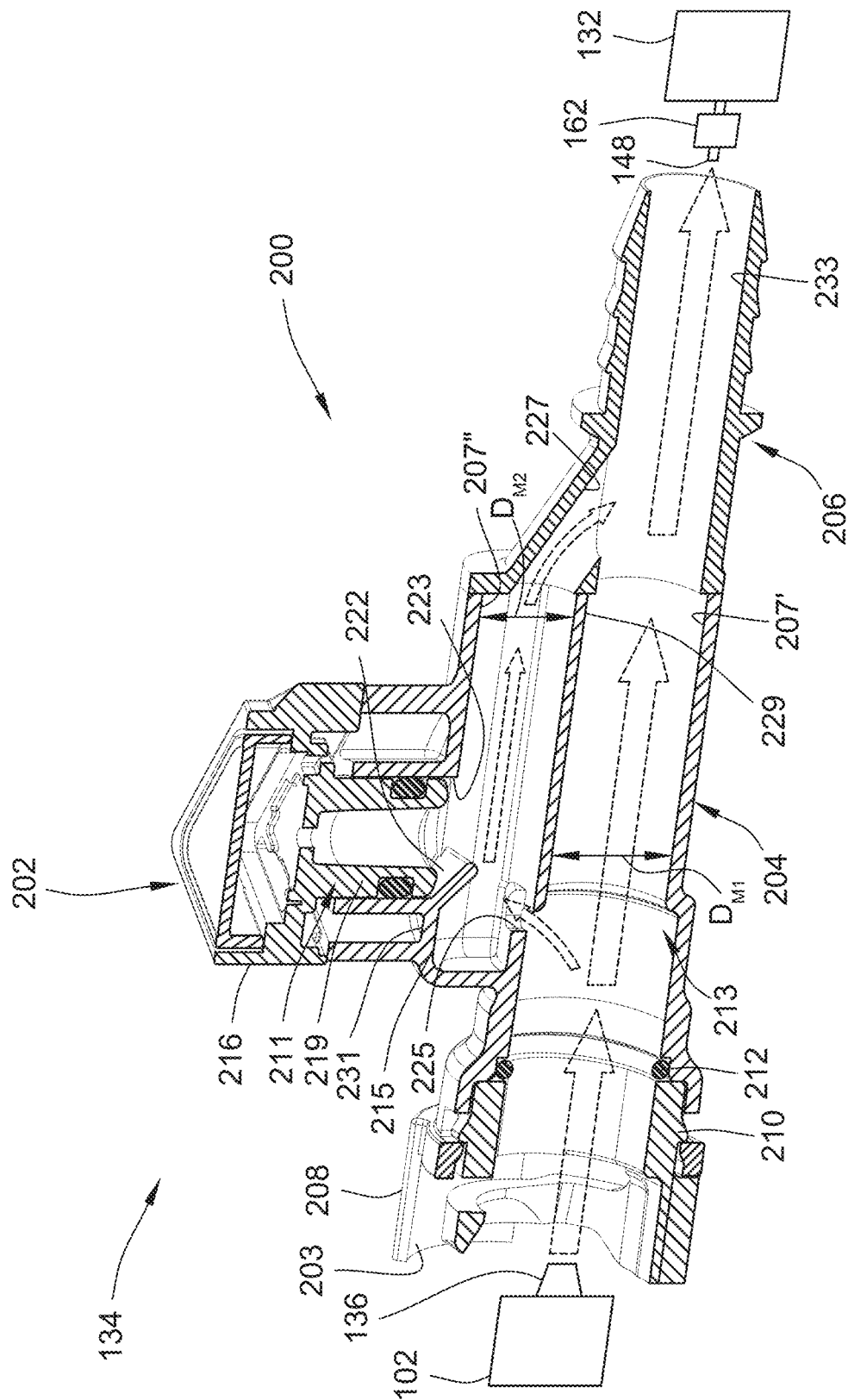
FIG. 3 is a cutaway, perspective-view illustration of the representative QC fluid coupler of FIG. 2.

With collective reference to FIGS. 2 and 3, the main connector body 204 may be fabricated with an inlet (first) end 201 having an inlet (first) port 203 that are both opposite to and upstream from an outlet (second) end 205 having at least one outlet (second) port 207. To fluidly connect the QC coupler 200 to the engine crankcase 102, the upstream, inlet end 201 of the main connector body 204 may be coupled to or integrally formed with a twist-lock connector 208 that securely mounts to the male PCV spigot 136 via a retainer clip 210 and an O-ring seal 212, both of which can be seen in the sectional view of FIG. 3. To fluidly connect the QC coupler 200 to the engine's air intake system 132, the downstream, outlet end 204 of the main connector body 204 operatively attaches to the connector endcap 206 that, in turn, fluidly couples to the PCV recirculation line 148. It is envisioned that the connector body 204 may employ other fluid adapter configurations and fitting types to fluidly connect the QC coupler 200 to the fluid source and fluid conduit.

Figure 4:
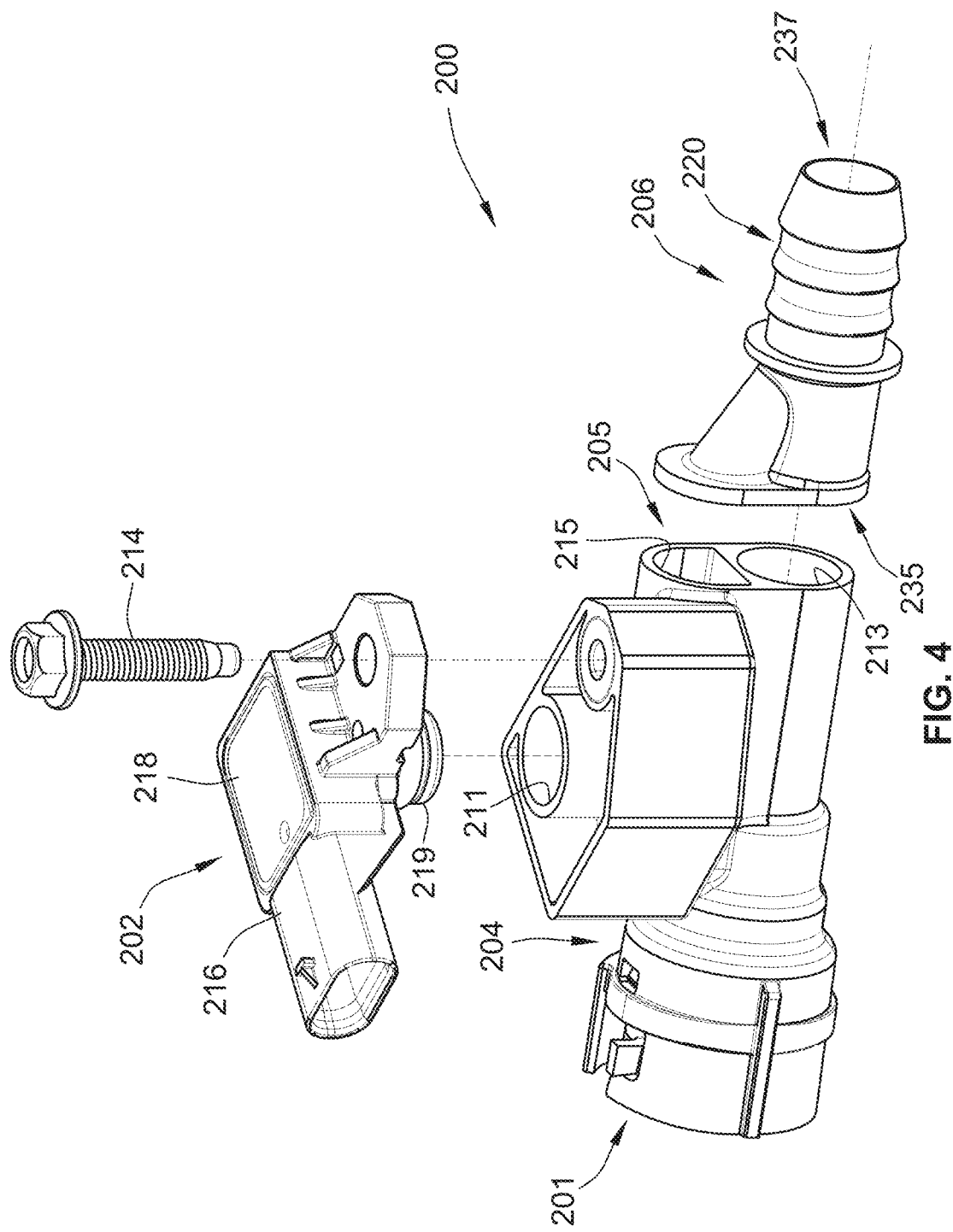
FIG. 4 is a partially exploded perspective-view illustration of the representative QC fluid coupler of FIG. 2.

Unlike most conventional PCV QC fitting designs, which contain a single blow-by gas passage, the main connector body 204 contains three distinct yet interconnected internal chambers: (1) a sensor chamber 211 defined within an upwardly projecting sensor tower 221 segment (FIG. 2) of the connector body 204; (2) a primary fluid chamber 213 subjacent the sensor chamber 211 and extending the length of the connector body 204; and (3) a secondary fluid chamber 215 structurally and fluidly interposed between the sensor chamber 211 and the primary fluid chamber 213. As best seen in FIG. 4, the CcPS assembly 202 may rigidly mount, e.g., via hex-head bolt 214, onto the main connector body 204 such that a downwardly projecting sensor cylinder 219 segment of the sensor assembly's housing 216 nests within the sensor chamber 211. The primary fluid chamber 213 is shown in FIG. 3 extending continuously from the inlet end 201 to the outlet end 205 of the main connector body 204 to thereby fluidly connect the connector body's inlet port 203 to a primary outlet port 207' of the primary fluid chamber 213. According to the illustrated example, the primary chamber 213 and the secondary chamber 215 may be straight-lined fluid channels that are substantially parallel with each other and both extending in the same direction (e.g., from left to right in FIG. 3).

For simplicity of design and manufacture, it may be desirable that the main connector body 204—including all three internal chambers 211, 213, 215—be integrally formed as a unitary, single-piece structure from a polymeric material (e.g., via injection molding, resin transfer molding, or AM printing). Furthermore, it may be desirable that that the secondary fluid chamber 215 be sandwiched between the sensor chamber 211 and the primary fluid chamber 213 such that there is no direct fluid connection between the primary chamber 213, including the blow-by gas flowing therein, and the sensor chamber 211, including the sensor assembly 202 packaged therein. To ensure comparable internal flowrates, the primary fluid chamber 213 may have a major (first) internal diameter $D_{M1}$ that is markedly larger (e.g., 30-50% bigger) than a minor (second) diameter $D_{M2}$ of the secondary fluid chamber 215. It is also envisioned that the internal diameter of the primary fluid chamber 213 may vary along the longitudinal length of the main connector body 204, such as the inlet port 203 diameter being markedly larger than the outlet port 207' diameter.

To enable fluid to flow from the primary chamber 213 into the sensor chamber 211, the secondary fluid chamber 215 is fluidly connected to the sensor chamber 211 by an intermediate sensor port 223 (FIG. 3), and the primary fluid chamber 213 is fluidly connected to the secondary fluid chamber 215 by an intermediate bleed port 225 that is fluidly upstream and across from the sensor port 223. This reduced-diameter bleed port 225 allows a diverted portion of the blow-by gas to flow from the primary chamber 213 into the secondary chamber 215, and through the secondary chamber 215 and sensor port 223 into the sensor chamber 211 and CcPS 202. A merge channel 227 fluidly downstream from the sensor port 223 and bleed port 225 fluidly connects a secondary outlet port 207'' of the secondary fluid chamber 215 to the primary outlet port 207' of the primary fluid chamber 213. As best seen in FIG. 3, the primary fluid chamber 213 may border the secondary fluid chamber 213, 215 and be separated therefrom by a mutually adjoining (first) internal wall 229 inside of the main connector body 204. This internal wall 229 defines therethrough the bleed port 225 that fluidly connects the primary and secondary chambers 213, 215. By comparison, the secondary fluid chamber 215 may be substantially orthogonal to the sensor chamber 211 and separated therefrom by a different mutually adjoining (second) internal wall 231 inside of the main connector body 204. This internal wall 231 defines therethrough the sensor port 223 that fluidly connects the sensor and secondary chambers 211, 215.

The QC coupler 200 fluidly connects to the PCV recirculation line 148 via the complementary connector endcap 206. Endcap 206 may sealingly attach to main connector body 204, for example, via a gasket and threaded fasteners, or may be integrally fabricated with the connector body 204 as a single-piece structure, for example, via welding, AM printing, injection molding, casting and machining, etc. As shown in FIGS. 2-4, the endcap 206 is manufactured as a discrete polymeric subcomponent by injection molding, and is thereafter welded to the connector body 204 by laser, ultrasonic, vibration, or spin welding to form one solid component. Located inside the endcap 206 is a Y-shaped fluid passage that is defined by the merge channel 227 and an intersecting exhaust channel 233. An upstream (first) end of the exhaust channel 233 is shown fluidly connected directly to the primary outlet port 207' of the primary fluid chamber 213, whereas the downstream (second) end of the exhaust channel 233 is shown fluidly connected directly to the PCV recirculation line 148. Comparatively, the merge channel 227 is interposed between and fluidly connects the secondary outlet port 207'' of the secondary fluid chamber 215 and the exhaust channel 233; in so doing, the merge channel 227 fluidly connects the downstream end of the secondary chamber 215 to the downstream end of the primary chamber 213.

FIG. 3 illustrates the endcap exhaust channel 233 coaxially aligned with the primary fluid chamber 213 and axially offset from the secondary fluid chamber 215. The merge channel 227, on the other hand, is shown obliquely angled (e.g., between about 30° and) 50° with respect to the primary and secondary chambers 213, 215. As a further option, it may be desirable that an internal diameter of the merge channel 227 be smaller than an internal diameter of the exhaust channel 233, which may be smaller than an internal diameter of the primary fluid chamber 213. As noted above, an upstream end 235 of the connector endcap 206 (FIG. 4) may be welded to the outlet end 205 of the main connector body 204. A downstream end 237 of the connector endcap 206, in contrast, may be attached to or integrally formed with a barbed hose connector 220 that press-fits into an open end of the PCV recirculation line 148. To prevent the unwanted ingress of liquid and moisture into the sensor chamber 211 and CcPS 202, the main connector body 204 may incorporate a sloped shield wall 222 (FIG. 3) that projects from the internal wall 231 at an oblique angle to partially cover/obstruct the sensor port 211. The sloped shield wall 222 may adjoin an upstream edge of the sensor port 211 and may project inward into the secondary fluid chamber 215.

During operation of the PCV system 134, blow-by gas is expelled from the crankcase 102, through the PCV spigot 136, and into the QC coupler 200 through the inlet port 203. Expelled blow-by gas travels downstream (e.g., from left-to-right in FIG. 3) through the primary fluid chamber 213; a diverted portion of the travelling blow-by gas enters the secondary fluid chamber 215 through the bleed port 225. The blow-by gas then flows along parallel paths through both the primary and secondary chambers 213, 215; a minor amount of gas may concomitantly be drawn into the sensor chamber 211 during evaluation thereof by the CcPS 202 assembly. The diverted portion of blow-by gas exits the secondary chamber 215 through the merge channel 227 and coalesces with gases exiting the primary chamber 213 through the outlet port 207'. The merged blow-by gas thereafter exits the QC coupler 200 through the downstream end 237 of the connector endcap 206 and enters the PCV recirculation line 148. When fluid pressure fluctuates within the engine's air intake system 132, a minor amount of blow-by gas may be drawn into the secondary chamber 215 through the merge channel 227 in the endcap 206. Nevertheless, a total amount of vapor entering the sensor chamber 211 may be significantly reduced over other available CQ fitting designs due the multi-chamber design and related features (e.g., as much as a 95% reduction based on FEA analysis). At the same time, the QC coupler 200 is also able to maintain substantially equivalent pressures between the main and auxiliary flow paths.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A quick-connect (QC) fluid coupler for fluidly coupling a fluid source to a fluid conduit, the QC fluid coupler comprising:
   a sensor assembly including a sensor housing with a sensing device located in the sensor housing and configured to monitor fluid flow from the fluid source to the fluid conduit;
   a main connector body including an inlet end with an inlet port opposite an outlet end with an outlet port, the main connector body defining therein:
   a sensor chamber attaching thereto the sensor housing;
   a primary fluid chamber extending from the inlet end to the outlet end of the main connector body and fluidly connecting the inlet and outlet ports; and
   a secondary fluid chamber interposed between the sensor chamber and the primary fluid chamber, wherein the secondary fluid chamber is fluidly connected to the sensor chamber via a sensor port and fluidly connected to the primary fluid chamber via a bleed port upstream from the sensor port and a merge channel downstream from the sensor port.

2. The QC fluid coupler of claim 1, further comprising an endcap mounted to the outlet end of the main connector body, the endcap defining therein the merge channel fluidly connecting the secondary fluid chamber to the primary fluid chamber.

3. The QC fluid coupler of claim 2, wherein the endcap defines therein an exhaust channel fluidly connected to the primary fluid chamber, and wherein the merge channel is interposed between and fluidly connect the secondary fluid chamber and the exhaust channel and thereby fluidly connects the secondary fluid chamber to the primary fluid chamber.

4. The QC fluid coupler of claim 3, wherein the secondary fluid chamber is substantially parallel to the primary fluid chamber, the exhaust channel is coaxial with the primary fluid chamber, and the merge channel is obliquely angled with respect to the primary and secondary fluid chambers.

5. The QC fluid coupler of claim 2, wherein the endcap includes opposing upstream and downstream cap ends, wherein the upstream cap end is welded to the outlet end of the main connector body, and the downstream cap end is integrally formed with a barbed hose connector.

6. The QC fluid coupler of claim 2, wherein the main connector body and the endcap are integrally fabricated as a single-piece structure.

7. The QC fluid coupler of claim 1, wherein the secondary fluid chamber is substantially parallel to the primary fluid chamber and separated therefrom by a first internal wall of the main connector body, the first internal wall defining therethrough the bleed port.

8. The QC fluid coupler of claim 1, wherein the secondary fluid chamber is substantially orthogonal to the sensor chamber and separated therefrom by a second internal wall of the main connector body, the second internal wall defining therethrough the sensor port.

9. The QC fluid coupler of claim 8, wherein the main connector body further includes a sloped shield wall projecting inward from the second internal wall at an oblique angle and partially obstructing the sensor port.

10. The QC fluid coupler of claim 1, wherein the sensor assembly is mounted onto the main connector body with a portion of the sensor housing disposed inside the sensor chamber.

11. The QC fluid coupler of claim 1, wherein the main connector body, including the sensor chamber, the primary fluid chamber, and the secondary fluid chamber, is integrally formed as a single-piece structure with the secondary fluid chamber sandwiched between the sensor chamber and the primary fluid chamber.

12. The QC fluid coupler of claim 1, wherein the inlet end of the main connector body is integrally formed with a twist-lock connector configured to attach to a male spigot of the fluid source.

13. The QC fluid coupler of claim 1, wherein the primary fluid chamber has a first internal diameter and the secondary fluid chamber has a second internal diameter less than the first internal diameter.

14. A motor vehicle, comprising:
   a vehicle body;
   a plurality of road wheels attached to the vehicle body;
   an internal combustion engine (ICE) assembly attached to the vehicle body and operable to drive one or more of the road wheels to thereby propel the motor vehicle, the ICE assembly including a crankcase with a ventilation spigot, an intake system and/or a turbocharger, and a recirculation line fluidly connected to the intake system and/or the turbocharger; and
   a quick-connect (QC) fluid coupler including:
   a pressure sensor assembly including a sensor housing with a pressure sensing device located in the sensor housing and configured to monitor pressure of a fluid flowing from the crankcase to the recirculation line;
   a single-piece main connector body including an inlet end with an inlet port opposite and upstream from an outlet end with an outlet port, the inlet port being fluidly coupled to the ventilation spigot of the crankcase, and the outlet port being fluidly coupled to the recirculation line, the main connector body defining therein:
   a sensor chamber nesting therein a portion of the sensor housing;
   a primary fluid chamber extending from the inlet end to the outlet end of the main connector body and fluidly connecting the inlet and outlet ports; and
   a secondary fluid chamber interposed between the sensor chamber and the primary fluid chamber, wherein the secondary fluid chamber is fluidly connected to the sensor chamber via a sensor port and fluidly connected to the primary fluid chamber via a bleed port upstream from the sensor port; and
   a single-piece endcap welded to the outlet end of the main connector body, the endcap defining therein a merge channel downstream from the sensor port and fluidly connecting the secondary fluid chamber to the primary fluid chamber.

15. A method of manufacturing a quick-connect (QC) fluid coupler for fluidly coupling a fluid source to a fluid conduit, the method comprising:
   receiving a sensor assembly including a sensor housing and a sensing device located in the sensor housing, the sensing device being configured to monitor fluid flow from the fluid source to the fluid conduit;
   forming a main connector body including an inlet end with an inlet port opposite an outlet end with an outlet port, the main connector body being formed to define therein:

a sensor chamber;

a primary fluid chamber extending from the inlet end to the outlet end of the main connector body and fluidly connecting the inlet and outlet ports; and a secondary fluid chamber interposed between the sensor chamber and the primary fluid chamber, wherein the secondary fluid chamber is fluidly connected to the sensor chamber via a sensor port and fluidly connected to the primary fluid chamber via a bleed port upstream from the sensor port and a merge channel downstream from the sensor port; and attaching the sensor housing to the sensor chamber of the main connector body.

16. The method of claim 15, further comprising mounting an endcap to the outlet end of the main connector body, the endcap defining therein the merge channel fluidly connecting the secondary fluid chamber to the primary fluid chamber.

17. The method of claim 16, wherein the endcap defines therein an exhaust channel fluidly connected to the primary fluid chamber, and wherein the merge channel is interposed between and fluidly connect the secondary fluid chamber and the exhaust channel and thereby fluidly connects the secondary fluid chamber to the primary fluid chamber.

18. The method of claim 15, wherein the secondary fluid chamber is substantially parallel to the primary fluid chamber and separated therefrom by a first internal wall of the main connector body, the first internal wall defining therethrough the bleed port.

19. The method of claim 15, wherein the secondary fluid chamber is substantially orthogonal to the sensor chamber and separated therefrom by a second internal wall of the main connector body, the second internal wall defining therethrough the sensor port.

20. The method of claim 19, wherein the main connector body further includes a sloped shield wall projecting inward from the second internal wall at an oblique angle and partially obstructing the sensor port.

\* \* \* \* \*